May 28, 1935.　　　　J. HOJNOWSKI　　　　2,002,740
AEROPLANE
Filed July 11, 1934　　　　3 Sheets-Sheet 1
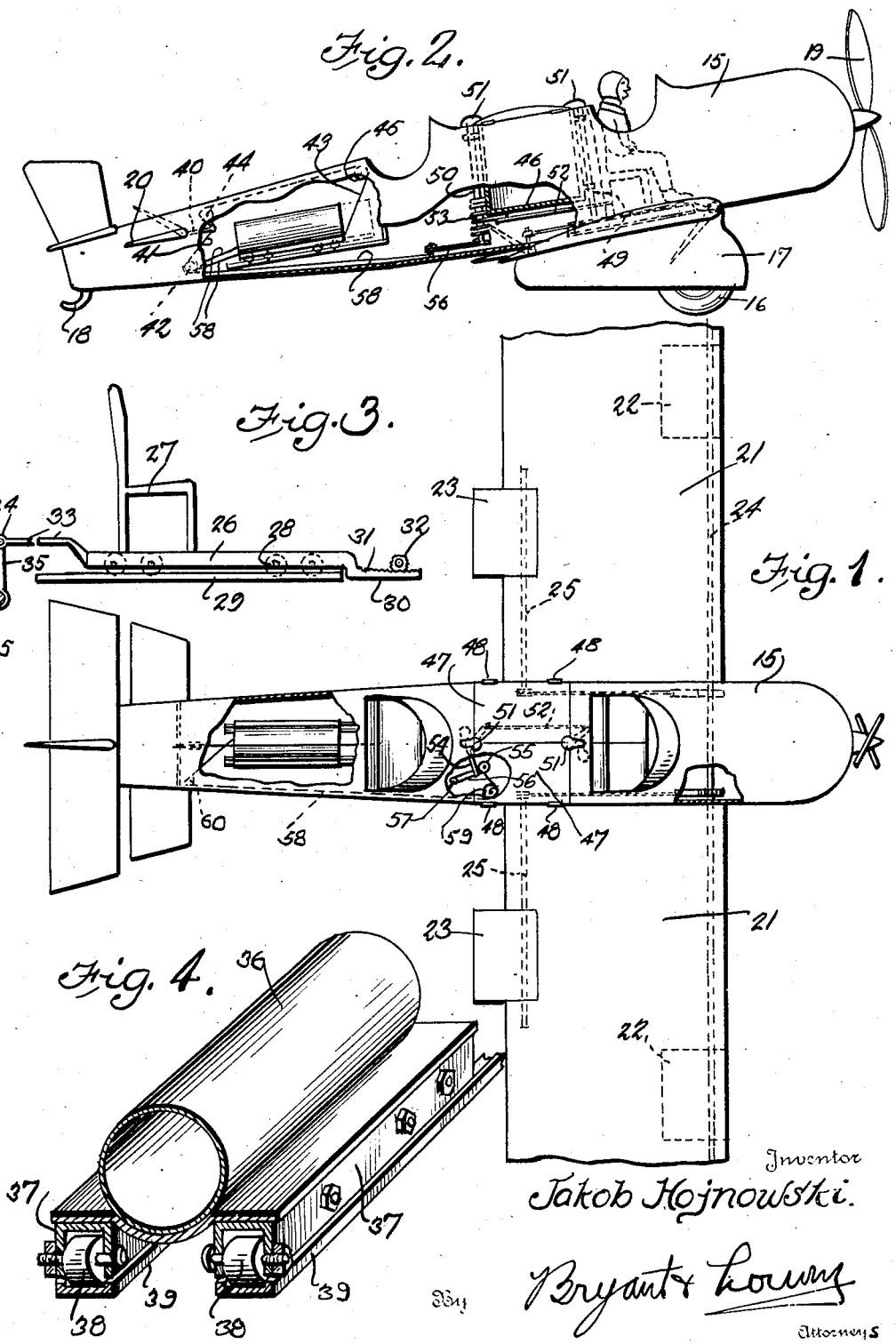

May 28, 1935. J. HOJNOWSKI 2,002,740
AEROPLANE
Filed July 11, 1934 3 Sheets-Sheet 2

Inventor
Jakob Hojnowski,
By Bryant & Lowry
Attorneys

May 28, 1935.  J. HOJNOWSKI  2,002,740
AEROPLANE
Filed July 11, 1934  3 Sheets-Sheet 3
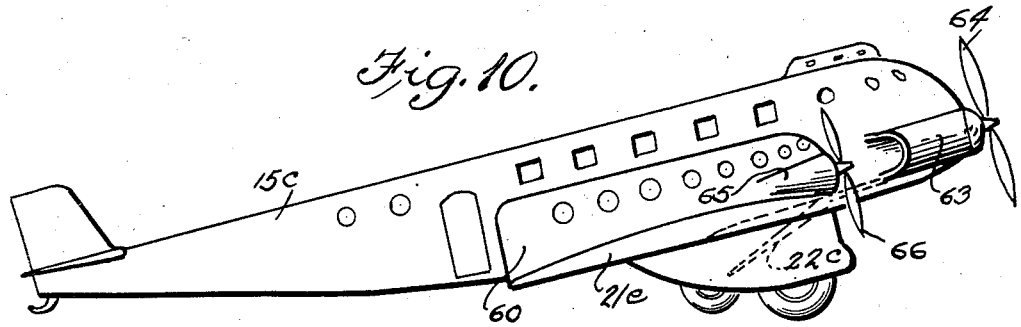
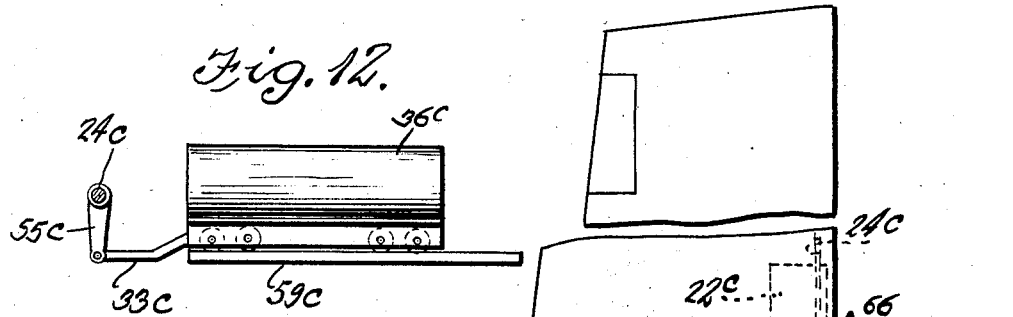
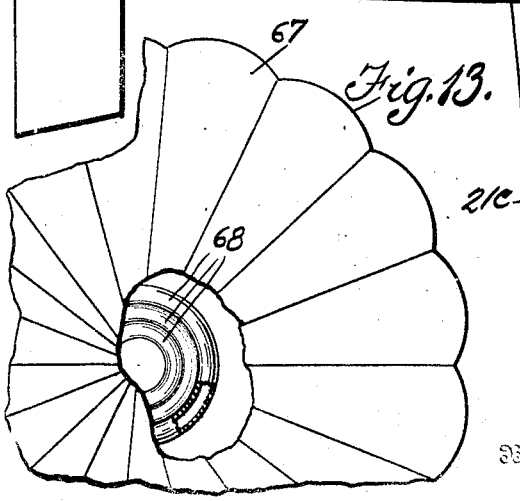
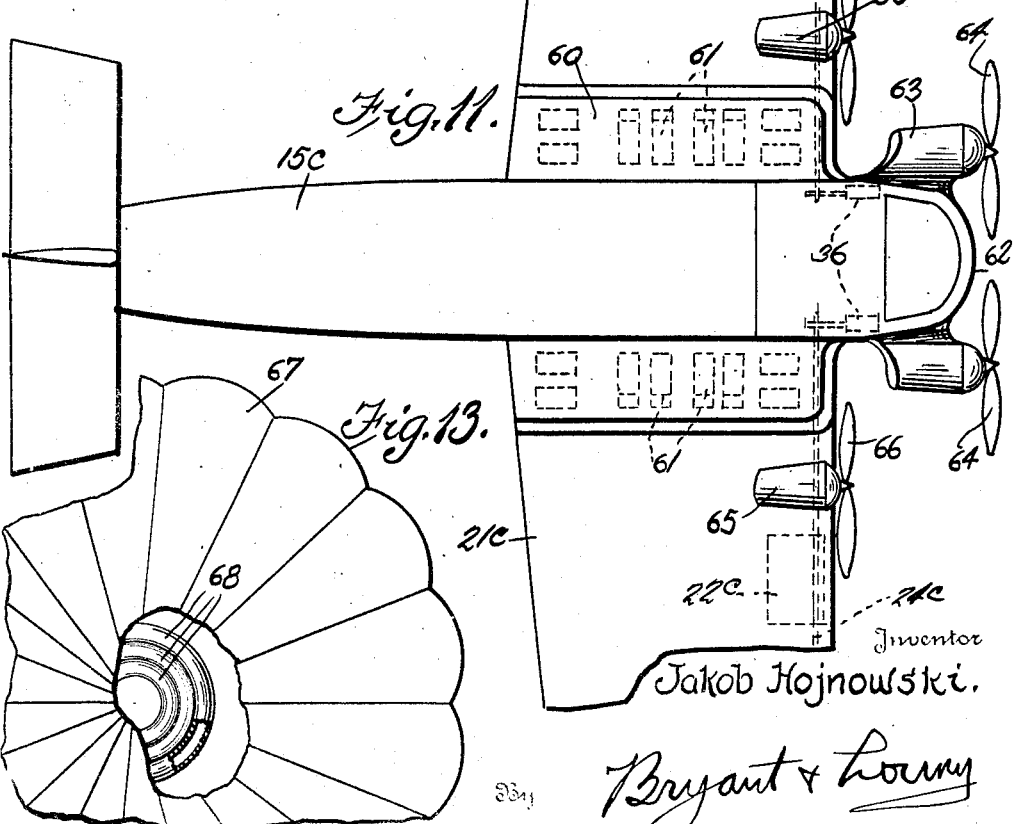
Inventor
Jakob Hojnowski.
Bryant & Lowry
Attorneys Patented May 28, 1935

2,002,740

UNITED STATES PATENT OFFICE 2,002,740

AEROPLANE

Jakob Hojnowski, Nekoosa, Wis.

Application July 11, 1934, Serial No. 734,660

3 Claims. (Cl. 244—21)

This invention relates to certain new and useful improvements in aeroplanes.

The primary object of the invention is to provide an aeroplane wherein the wings are provided with ailerons at their meeting and trailing edges respectively moving downwardly and upwardly on hinge mountings and automatically operated to prevent nose dives.

A further object of the invention is to provide an aeroplane of the foregoing character wherein the ailerons are directly connected with a movable part of the aeroplane, such as a movably mounted passenger or pilot carriage for instant operation of the ailerons.

A still further object of the invention is to provide a parachute attachment for aeroplanes wherein a casing for the confined parachute has hinged covers with tensioned latch devices associated therewith for retaining the covers in closed condition with a sliding weight, such as a gasolene tank having cable connections with the tensioned latches for release thereof when the weight or tank shifts in the presence of a nose dive position of the aeroplane to permit opening movement of the casing covers and release of the parachute.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary top plan view, partly broken away and shown in section of an aeroplane constructed in accordance with the present invention, showing the positive operating connection between the pilot or passenger carriage and ailerons and the sliding weight or gasolene tank for the operation of the casing covers to release the parachute;

Figure 2 is a side elevational view, partly broken away and shown in section to illustrate the tensioned latches containing the hinged covers of the parachute casing in closed position and the releasing means therefor;

Figure 3 is a fragmentary elevational view of the sliding pilot or passenger carriage showing the pinion and gear operating means for the leading aileron and the arm operating means for the rear aileron;

Figure 4 is a fragmentary perspective view, partly in section of the sliding weight or gasolene tank;

Figure 10 is a side elevational view of another form of aeroplane having propellers laterally of the fuselage and supported by the side wings with a second pair of propellers and motors therefor supported in housings carried by the fuselage at opposite sides thereof;

Figure 11 is a fragmentary top plan view of the aeroplane shown in Figure 10, showing a sleeping or storage compartment at each side of the fuselage above the wings;

Figure 12 is a detail elevational view of the gasolene tank shiftably mounted upon the operation of leading ailerons of the aeroplanes shown in Figures 10 and 11; and Figure 13 is a fragmentary plan view, partly broken away and shown in section of the parachute and illustrating buoyant chambers or rings in the top of the parachute.

Figure 5:
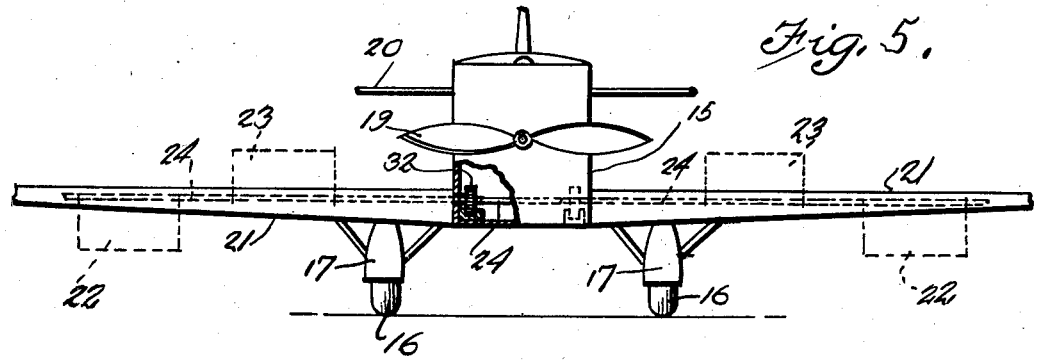
Figure 5 is a front elevational view, partly broken away and shown in section to illustrate the rack and pinion operating mechanism for the leading aileron.

A shown in Figures 1 to 5, the aeroplane comprises a fuselage 15 having a forward landing gear including wheels 16 in housings 17 and a rear skid 18. The fuselage 15 carries a forwardly positioned motor driven propeller 19, an elevator 20 adjacent its rear end and a cross wing comprising wing sections 21 extending laterally at each side of the fuselage 15 adjacent the lower side thereof as shown in Figures 2 and 5.

The leading edge of each side wing section 21 is provided with an aileron 22 carried by the underside of the wing section to open downwardly, hinging adjacent the leading edge of the wing section, while the rear or trailing edge section carries an aileron 23 at the upper side that opens upwardly, hinging at its forward edge to the wing section and extending rearwardly of the wing section. The ailerons 22 and 23 have the hinge mountings therefor in the form of shafts 24 and 25, that are journalled in suitable bearings in the wing sections. The shaft 24 extends through the fuselage 15 as shown in Figure 1 while the shaft 25 at the trailing edge of the wing sections is formed in two parts with adjacent ends thereof extending into the fuselage. The operating means for the shafts 24 and 25 for moving the ailerons 22 and 23 to bring the aeroplane out of a nose dive includes a shiftably mounted pilot or passenger carriage comprising a tread plate 26 shown in Figure 3 as provided with a seat 27 and carrying rollers 28 engaged with a base plate or track 29. A forwardly extending arm 30 is carried by each forward corner edge of the tread plate 26 and is provided on its upper side with rack teeth 31 meshing with a pinion 32 fixed to the shaft 24. The connection between the shiftably mounted passenger carriage and the rear shaft section 25 includes a rearwardly extending arm 33 carried by each rear corner edge of the tread plate 26 that are pivotally connected at their rear ends as at 34 to an adjacent link 35 fixed to and rising from the adjacent shaft section 25. It will therefore be seen that when the aeroplane enters a nose dive, the passenger carriage will shift on its roller mounting 28 over the base plate or track 29 for the operation of the two shafts 24 and 25. To lower the forwardly positioned aileron 22 and to elevate the rearwardly positioned ailerons 23 for bringing the aeroplane out of the nose dive, this operation being entirely automatic.

The elevator 20 is also automatically operated by means of a shiftably mounted weight, such as the gasolene tank 36 shown more clearly in Figs. 1, 2 and 4, the tank 36 being carried by a frame structure including longitudinally extending side channels 37 opening at their lower sides with rollers 38 journalled between the sides of the channel members for rolling contact with channel guides or tracks 39 within the fuselage 15. The connection between the gasolene tank 36 and the elevator 20 includes an arm 40 fixed to and projecting forwardly of the pivot for the elevator, the forward end of the arm 40 having a cable 41 attached thereto and trained over a pulley 42 and thence directed forwardly for attachment to the rear end of the tank 36. A second cable 43 is attached at one end to the free end of the arm 40 and extends upwardly over the guide pulley 44, forwardly over the guide pulley 45 and thence downwardly for attachment to the forward end of the gasolene tank 36. When the gasolene tank shifts longitudinally of the fuselage 15, the cables 41 and 43 operate for the shifting of the elevator 20.

The aeroplane is equipped with a parachute that is housed within the casing 46 within the fuselage, substantially midway the ends thereof, the casing being provided with a pair of cover sections 47 hinged at their outer side edges as at 48 with the free edges thereof seating midway the opposite sides of the casing as shown in Figure 1. Tensioned closure latches are associated with the hinged cover sections 47 and include a pair of perpendicular journalled rods 49 and 50 positioned adjacent the meeting edges of the hinged covers, each of the rods carrying a latch 51 to overlie the meeting edges of the cover sections to retain them in closed position, the rods 49 and 50 being simultaneously operated by means of the link rod connection 52 between the lower ends thereof as shown in Figs. 1 and 2. The two rods 49 and 50 are rotatably tensioned for normally positioning the latch heads 51 in overlying relation to the meeting edges of the hinged cover sections 47 by means of a coil spring 53 associated with the rod 50 as shown in Figure 2.

As shown in Figure 1, an arm 54 projects laterally of the lower end of the rod 50 and is engaged at its outer free end by the head or roller 55 upon the free end of a lever 56 that is pivotally mounted at its other end as at 57. The cable 58 passing over the pulley 59 is attached at one end to the lever 56 and the other end passing over a guide roller 60 adjacent the rear end of the fuselage is then forwardly directed for attachment to the rear end of the gasolene tank 36. When the gasolene tank 36 shifts or slides forwardly on its track when the aeroplane enters into a nose dive, a pull is exerted on the cable 58 for moving the lever 56 to release the arm 54 whereby the spring 53 associated with the rod 50 causes both rods 49 and 50 to be rotated for shifting the latch head 51 laterally of the cover sections 47 for the release of the parachute confined within the casing 46 that may be manually accomplished, or by means of a gas holder associated with the parachute.

Figure 6:
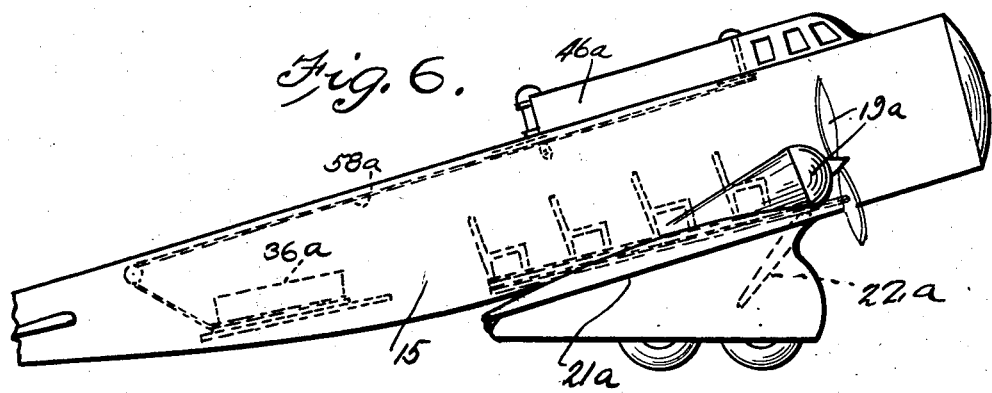
Figure 6 is a side elevational view of another form of aeroplane wherein the parachute casing is located above the fuselage and laterally positioned propellers.
Figures 7, 8:
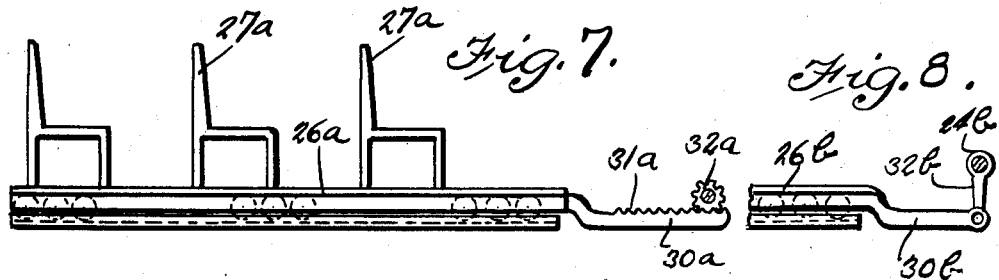
Figure 7 is a detail elevational view of the sliding carriage shown in Figure 6, carrying the operating means for the leading aileron.
Figure 8 is a detail elevational view of another form of operating means for the leading ailerons carried by the pilot or passenger carriage.
Figure 9:
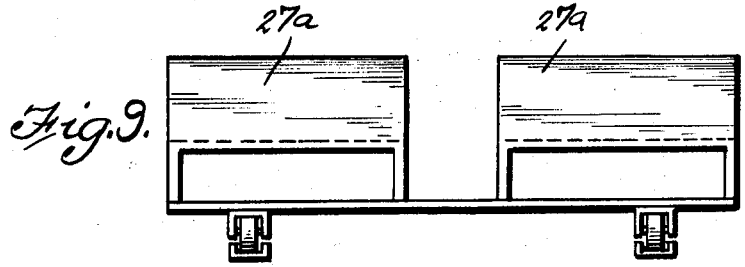
Figure 9 is a rear elevational view of the sliding pilot or passenger carriage.

In the form of invention illustrated in Figures 6, 7 and 9 the fuselage 15 carries a shiftably mounted tread plate 26a carrying passenger seats 27a and also having forward arm extensions 30a provided with rack teeth 31a meshing with a pinion 32a. In lieu of the single forward propeller 19 shown in Figs. 1 to 5, there is provided a pair of lateral motors and propellers 19a carried by the side wing sections 21a. In this form of the invention the side wing sections 21a are provided with ailerons 22a at their forward meeting edges only that are operated by the rack and pinion devices shown in Fig. 7. Also, in this form of the invention, the parachute casing 46a is superposed upon the upper side of the fuselage 15 and has a cable connection 58a for the operation of the hinged covers thereof of the sliding gasolene tank 36a. The passenger carriage shown in Figure 9 is provided with two rows of seats 27a.

In lieu of the rack and pinion drive as shown in Figures 3 and 7 for the operation of the ailerons at the leading edges of the wings, the tread plate 26b of the passenger carriage as shown in Figure 8 is provided with a forwardly extending arm 30b for attachment to the link 32b that is fixed to the shaft 24b.

In the form of invention illustrated in Figures 10 to 12, the fuselage 15c is provided with side wings 21c in a plane adjacent the lower side of the fuselage and a housing 60 is superposed on each wing adjacent the fuselage for use as a passenger compartment or for the storage of luggage or the like as shown at 61. A nosing frame 62 is carried by the forward end of the fuselage 15c and includes a pair of laterally positioned open ended housings 63 in which motors are mounted for the operation of the propellers 64. Another housing 65 is carried by each wing section 21c at its forward edge adjacent the housing 60 for the support of a motor to drive the propellers 66. A gas tank 36c as shown in Figures 11 and 12 is associated with two motors at each side of the fuselage, the same being slidably mounted upon a track 59c and carrying a rearwardly directed arm 33c that is pivotally connected at its rear free end to an adjacent end of a link 55c fixed at its other end to the shaft 24c which forms a hinge bearing for the forwardly positioned ailerons 22c.

As shown in Figure 13, the parachute 67 carries centrally of its upper end a plurality of concentric chambers or tubes 68 to contain helium or other light gas to aid the parachute in the support of the aeroplane.

From the above detailed description of the invention, it is believed that the construction and operation thereof will at once be apparent and while there are herein shown and described the preferred embodiments of the invention, it is nevertheless to be understood that minor changes may be made therein without departing from the spirit and scope of the invention as claimed.

I claim:

1. In an aeroplane, a fuselage, a wing on the fuselage, dive controlling ailerons at the leading and trailing edges of the wing, an elevator at the rear end of the fuselage, a track in the fuselage, a wheeled weight on the track, a sliding passenger carriage in the fuselage, means forming direct connections between the sliding carriage and ailerons for operation thereof by movements of the carriage, including journalled shafts in the wing to which the ailerons are attached, rack and pinion connections between one end of the carriage and a shaft, link arm connections between the other end of the carriage and the other shaft, cable connections between the wheeled weight and elevator, a parachute casing having hinged covers, connected and tensioned latch rods for holding the covers in closed position, an arm projecting from one latch rod, and a lever for restraining the arm from movement having a cable connection with the wheeled weight for operation of the lever to release the arm.

2. In an aeroplane, a fuselage, a wing on the fuselage, dive controlling ailerons hinged to the leading and trailing edges of the wing, a sliding passenger carriage in the fuselage and means forming communication between the ailerons and carriage including journalled shafts for the support of the ailerons, pinions fixed to the forward shaft, rack bars on the carriage engaged with the pinions and link and lever connections between the carriage and rear shafts.

3. In an aeroplane, a fuselage, a wing on the fuselage, dive controlling ailerons hinged to the leading and trailing edges of the wing, a sliding passenger carriage in the fuselage and means forming communication between the ailerons and carriage including journalled shafts for the support of the ailerons, pinions fixed to the forward shaft, rack bars on the carriage engaged with the pinions and link and lever connections between the carriage and rear shafts, a parachute casing in the fuselage, having hinged covers, a pair of rods, each having a latch head engaged with the covers to retain them in closed position, a link and arm connection between the rods to effect simultaneous operation, tensioning means for one rod for disengaging the latch heads from the covers, means for holding the latch heads engaged with the covers and a slide weight in the fuselage connected to said means for shifting the same when the aeroplane enters a nose dive to release the latch heads from engagement with the covers.

JAKOB HOJNOWSKI.